C. M. SUCK.
ADJUSTABLE SUPPORT FOR CAMERAS.
APPLICATION FILED SEPT. 13, 1915.

1,185,448.

Patented May 30, 1916.

WITNESSES:
E. M. Callaghan
H. E. Beck

INVENTOR
CHARLES M. SUCK,
BY Munn & Co.
ATTORNEYS

UNITED STATES PATENT OFFICE.

CHARLES M. SUCK, OF SALEM, WEST VIRGINIA, ASSIGNOR OF ONE-FOURTH TO JOHN ELIAS, OF SALEM, WEST VIRGINIA.

ADJUSTABLE SUPPORT FOR CAMERAS.

1,185,448. Specification of Letters Patent. Patented May 30, 1916.

Application filed September 13, 1915. Serial No. 50,353.

*To all whom it may concern:*

Be it known that I, CHARLES M. SUCK, a citizen of the United States, and a resident of Salem, in the county of Harrison and State of West Virginia, have invented a new and useful Improvement in Adjustable Supports for Cameras, of which the following is a specification.

The invention is an improvement in supports, and has particular reference to an adjustable device for supporting a camera in both horizontal and vertical positions.

An object of the invention is to provide a device of this character secured to a tripod and including a seat adapted to be detachably secured to a camera, said seat being pivotally mounted so that the same may be adjusted to vertical and horizontal positions, means being also provided for retaining said seat in its adjusted positions.

Another object of the invention is to provide a camera support which is extremely simple in construction, easy to manufacture, durable and effective in carrying out the purpose for which it is designed.

The inventive idea involved is capable of receiving a variety of mechanical expressions, one of which for the purpose of illustrating the invention is shown in the accompanying drawings, in which:—

Figure 1:
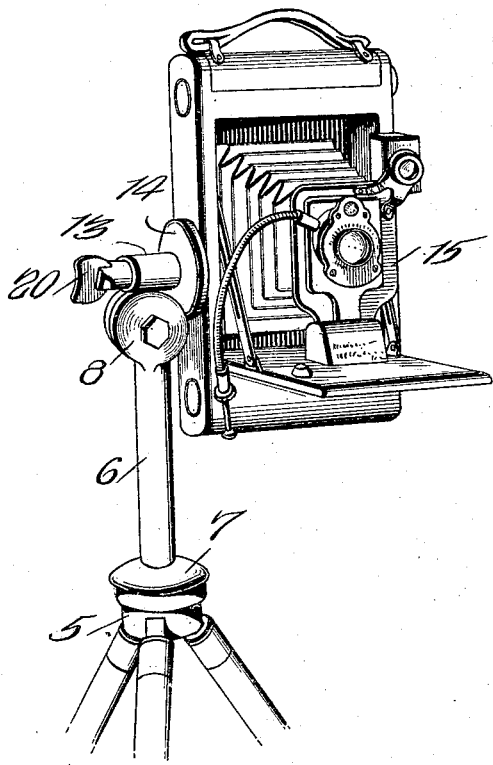
Figure 2:
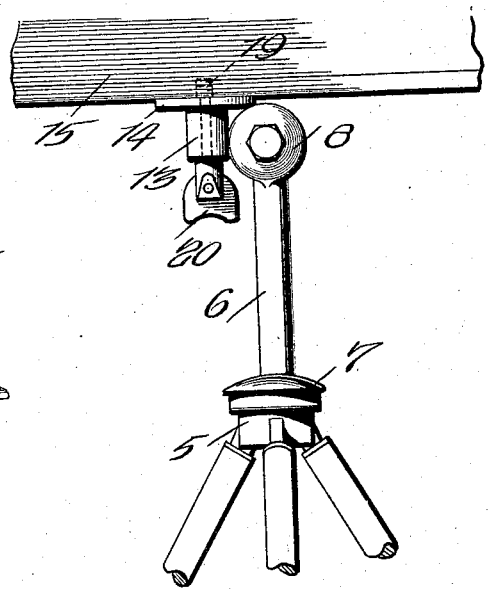
Figure 3:
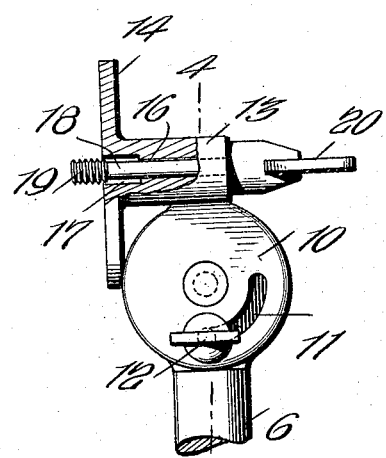
Figure 4:
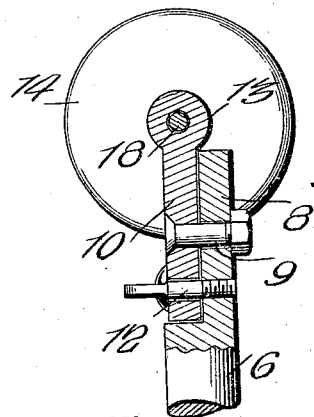

Figure 1 is a perspective view of the support showing its camera attached thereto and arranged in vertical position, Fig. 2 is a side elevation showing the camera in horizontal position, Fig. 3 is a side elevation of an adjusted portion of said support, the same being partly broken away and shown in section, and Fig. 4 is a section on the line 4—4 of Fig. 3.

The device which embodies the principal feature of this invention is preferably used in connection with a tripod 5 of ordinary construction and includes a standard 6, having a base 7 adapted for connection with the top of said tripod. The upper end of the standard 6 is provided with a vertically arranged plate 8, preferably circular in formation and of a width substantially one-half of the diameter of the standard 6, as shown in Fig. 4. Centrally located in the plate 8 is a pivot bolt 9, upon which is mounted a rotatable element 10, preferably in the form of a disk and having an arcuate concentric slot 11 therein adapted to receive a wing bolt 12, which is threaded into a plate 8, whereby the head of said bolt may be adapted to tightly engage the disk 10 in order to retain the same in an adjusted position. The bearing 13, preferably circular in cross section, is secured to the periphery of the rotatable element 10 and arranged tangentially relative thereto, said bearing terminating at one end in a circular flange 14, which provides a seat against which a camera 15 is adapted to abut. The flange 14 is also in the form of a disk and the plane thereof extends at right angles to the plane of the disk 10. The bearing 13 is provided with a longitudinal opening 16, enlarged at 17 adjacent the seat 14, and adapted to receive therein a fastening element 18, threaded at 19 and adapted to engage a threaded opening formed in the camera 15. The other end of the element 18 is provided with a handle 20 for rotating said element to secure the same to the camera. The fastening device 18 is preferably mounted so as to be adjustable longitudinally of the bearing 13, and for this purpose the opening 16 is enlarged at 17 to receive the screw thread 19 therein when the camera is being detached from the support.

In practice, should the camera be in the position illustrated in Fig. 1 and it is desired to adjust the same to the horizontal position shown in Fig. 2, the bolt 12 is first loosened so as to permit the rotatable element 10 to swing about its pivot 9. This will permit the support including the flange seat 14 to be moved to the position illustrated in Fig. 2, after which the bolt 12 may again be tightened and the camera retained in its adjusted position.

I claim:—

1. In a camera support the combination of a standard, an oscillatory disk adjustably connected thereto, a bearing secured to the periphery of said disk and arranged tangentially thereto, one end of said bearing being provided with a seat, and means mounted in said bearing for securing a camera to said seat.

2. In a camera support the combination of a standard, an oscillatory disk adjustably connected thereto, a bearing secured to the periphery of said disk and arranged tangentially thereto, one end of said bearing being provided with a seat, and means adjustable longitudinally of said bearing for securing a camera to said seat.

3. In a camera support the combination of a standard, an oscillatory disk adjustably connected thereto, a bearing secured to the periphery of said disk and arranged tangentially thereto, one end of said bearing being provided with a seat, means mounted in said bearing for securing a camera to said seat, and means for retaining said disk in its adjusted positions.

4. In a camera support the combination of a standard, an oscillatory disk adjustably connected thereto, a bearing secured to the periphery of said disk and arranged tangentially thereto, one end of said bearing being provided with a seat, means adjustable longitudinally of said bearing for securing a camera to said seat, and means for retaining said disk in its adjusted positions.

5. In a camera support, the combination of a standard, an oscillatory disk pivoted thereto and having an arcuate slot therein, means carried by said standard and engaging in said slot for securing said disk in an adjusted position, a bearing formed on said disk and having a longitudinal opening enlarged at one end, said bearing having a camera seat at the end thereof containing the enlarged part of the opening, and a fastening element including a screw threaded end adjustable longitudinally of said bearing, said screw threaded end being adapted to be withdrawn into the enlargement in said opening when the camera is being detached from said seat.

6. In a camera support, the combination of a standard, an oscillatory disk adjustably connected thereto, a bearing secured to the periphery of said disk and having a longitudinal opening enlarged at one end, and a fastening element mounted in said bearing for securing a camera to the same, one end of said fastening element being withdrawn into the enlargement in said opening when detaching a camera from the support.

CHARLES M. SUCK.

Witnesses:
G. W. F. RANDOLPH,
CARL COBUN.

Copies of this patent may be obtained for five cents each, by addressing the "Commissioner of Patents, Washington, D. C."